United States Patent [19]

Brown

[11] Patent Number: 4,578,896

[45] Date of Patent: Apr. 1, 1986

[54] HOLDER FOR CROSSED WIRES

[76] Inventor: Edward R. Brown, 5440 Lindley Ave., #209, Encino, Calif. 91316

[21] Appl. No.: 594,721

[22] Filed: Mar. 29, 1984

[51] Int. Cl.⁴ ............................................. A01G 17/06
[52] U.S. Cl. ....................................... 47/45; 403/391
[58] Field of Search ..................... 403/385, 391, 400; 52/719; 174/175; 47/44, 45, 46

[56] References Cited

U.S. PATENT DOCUMENTS

| | | | |
|---|---|---|---|
| 675,850 | 6/1901 | Brunneder | 47/45 |
| 863,620 | 8/1907 | Martens | 47/45 |
| 1,225,281 | 5/1917 | Sorensen | 47/46 |
| 1,980,239 | 11/1934 | Vetter | 47/44 |
| 2,619,580 | 11/1952 | Pontiere | 174/175 X |
| 3,360,883 | 1/1968 | Glanzer | 403/385 X |
| 3,863,416 | 2/1975 | Oroschakoff | 52/719 X |

FOREIGN PATENT DOCUMENTS 21960   1/1981   European Pat. Off. ................ 47/44

Primary Examiner—Andrew V. Kundrat
Attorney, Agent, or Firm—Herzig & Yanny

[57] ABSTRACT

A wire holding device adapted for holding or retaining wires that intersect or pass each other such as in a grid trellis. A piece or block of material is provided having slots or openings in it on opposite sides of the material in an angular orientation with respect to each other corresponding to the angular orientation of the wires to be held.

7 Claims, 4 Drawing Figures

U.S. Patent  Apr. 1, 1986  4,578,896
FIG. 1.
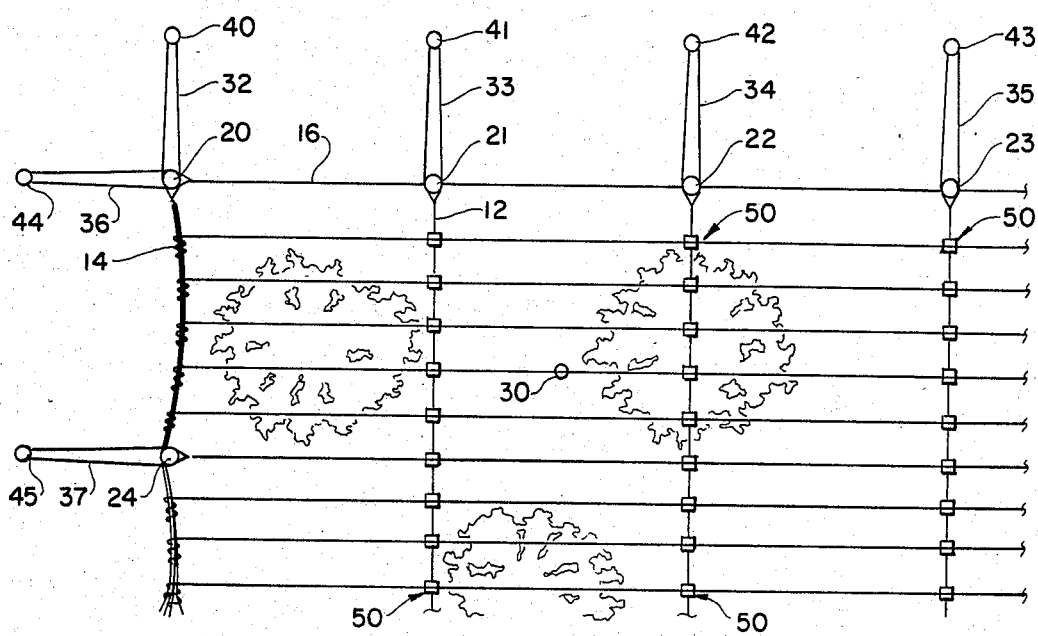
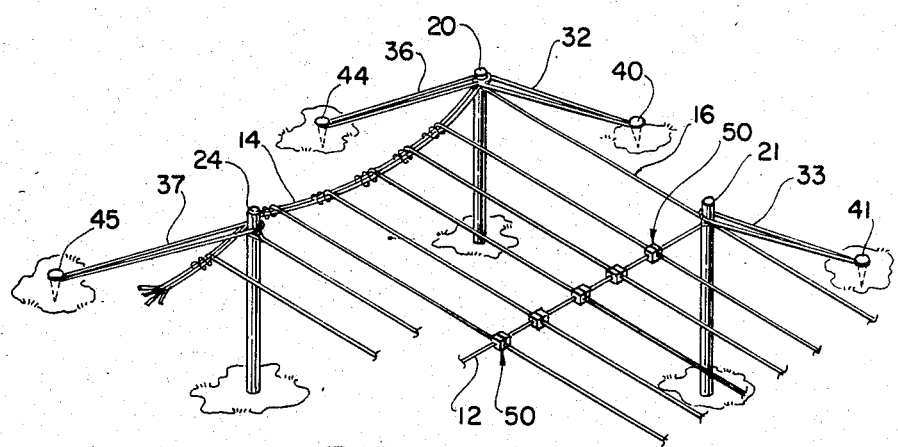
FIG. 2.
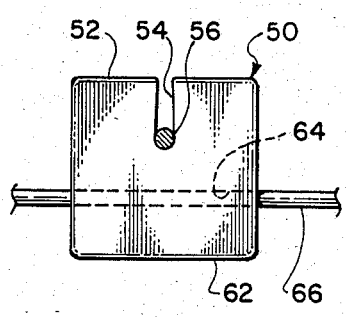
FIG. 4.
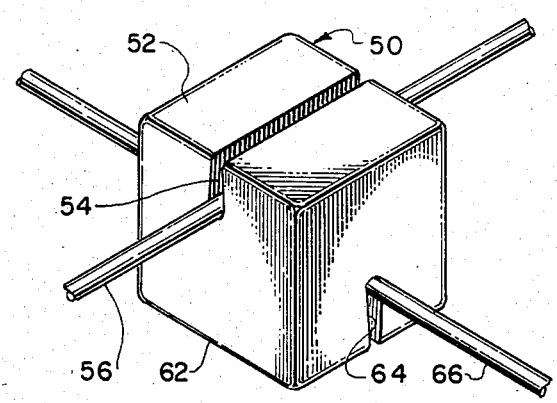
FIG. 3.

HOLDER FOR CROSSED WIRES

BACKGROUND OF THE INVENTION

1. Field of the Invention

The invention is the field of holding devices for holding wires particularly crossing or intersecting wires and more particularly to such a device adapted for utilization in a grid trellis, as explained in detail hereinafter.

2. Description of the Prior Art

With respect to backround attention is called to U.S. Pat. Nos. 1,225,281; 2,505,700; and 3,248,089.

A particular type of equipment wherein there is a structure involving intersecting or crossing wires is that of a grid trellis. A trellis is a frame or lattice work adaptable for use as a screen or as a support for climbing plants or other types of plants which may be fruit bearing plants. Typically, a trellis is formed as a grid work of wires supported by way of posts and tie back wires. Conventionally a grid trellis of this type is used for kiwifruit plantings. The horizontal grid trellis can support heavy fruit loads of kiwifruit planting in a large area. The grid trellis allows for clear access for easy pruning and picking. In this type of construction there are, of course, points at which wires running in one direction and another direction that form part of the grid cross each other. At points where wires cross each other it is necessary to provide something to hold them together at that point. Wires as conventionally used may typically have a galvanized coating. The device for holding or positioning the wires should prevent them from rubbing together in a manner to disturb the coating. A manner of holding the wires together at the crossing points, as has been known in the prior art, is to pass one of the lace wires through a sleeve and then to position the sleeve in between the stands of wires which is a two strand cable running in the opposite direction, that is, transverse to the lace wires. This type of construction is subject to various deficiencies among them being the difficulty of installing this type of holder since it is time consuming and tedious. The wires normally are twisted at the point where the sleeve is inserted between strands.

The herein invention, a preferred form of which is described in detail hereinafter, seeks to overcome all of the deficiencies of the prior art as described above and further to prove a device having additional advantages all as pointed out hereinafter.

SUMMARY OF THE INVENTION

A preferred form of the invention is illustrated in the drawings and is described briefly in the abstract.

The preferred form of the invention is particularly adapted for use in holding the wires of the grid trellis together at the crossing points of the wires. The utility of the invention is not, however, limited to this particular application of it.

A grid trellis, typically, is mounted horizontally at a height of, for example, six feet above the ground for use in connection with growing plants such as kiwifruit plantings, the horizontal grid trellis being capable of supporting heavy fruit loads of plantings in a large area while still providing access for pruning and picking.

Typically the trellis is formed of grid wires parallel to each other running in one direction and lace wires running in the opposite direction, there, of course, being cross points where individual wires cross or pass each other and at which point it is desired to hold the wires together. The device of the invention is particularly adapted for installation at the cross points of the wires of the trellis for holding them together. The trellis may be supported by upright posts at the corners and at other points as may be appropriate or necessary as well known in the art. Appropriate tie backs or hold back wires may be provided associated with corner posts or other posts at the sides of the grid for holding it in position.

In a preferred form of the invention as described in detail hereinafter it takes the form of a piece or block of material which may simply be a cube which has a slot formed in one side and a slot formed in an opposite side, the two slots being displaced from each other 90°. The inner ends of the two slots do not intersect each other so that there is material of the block in between them keeping the wires separated. The block may be formed from suitable material, such as plastic or other material. Preferably the material has a degree of resiliency. The slots have a taper, that is, being narrower at the entrance part of the slot than at the bottom so that a wire can be slipped into the slot then held at the bottom of the slot.

In the light of the foregoing, a primary object of the invention is to make available an improved and simplified holding device for holding together linear elements such as wires at crossing points of the wires.

A further object is to provide a device as in the foregoing, possessing the capability of holding both of the wires at the intersecting point while preventing them from contacting each other.

A further object provides a device as in the foregoing, in the form of a block which may preferably be simply a cube of material having a degree of resiliency, the material having an inwardly extending slot on one side formed to receive a wire and an inwardly extending slot on the opposite side formed to receive a wire, the slots being oriented at an angle to each other which may preferably be 90°.

Further objects and additional advantages of the invention will become apparent from the following detailed description and annexed drawings.

BRIEF DESCRIPTION OF THE DRAWINGS

FIG. 1 is a schematic plan view of a grid trellis having holding devices made in accordance with the invention at the crossing points of the grid wires;

FIG. 2 is a partial isometric view of the grid trellis and holding devices as shown in FIG. 1;

FIG. 3 is an isometric view of a preferred form of the invention;

FIG. 4 is a sectional view taken along the line 4—4 of FIG. 3.

DESCRIPTION OF A PREFERRED EMBODIMENT AND BEST MODE OF PRACTICE

Referring to the drawings this figure is a plan view of a grid trellis which may be a generally conventional type adapted for use with growing plants such as, for example, kiwifruit plantings. FIG. 1 illustrates, schematically, growing plants with which the trellis is used. Typically the trellis is positioned at a level such that heavy fruit loads are supportd by the trellis.

In FIG. 1 one group of parallel wires may be designated as north-south grid wires, one of which is designated by the numeral 12. These wires are parallel to each other as shown. These wires include a perimeter wire 14 and by way of example these wires may consist of two strands of high tensile fence wire of the type such as may conventionally be used for this purpose. Typically there are four perimeter strands for attaching the lace wires which are the wires running in the opposite direction, one of them being designated by the numeral 16. The lace wires may be spaced 2 to 3 feet apart. Typically the wires are of a type having a galvanized coating so that it is desired to prevent the wires from rubbing against each other at the points of intersection.

The grid trellis is supported on posts which include a corner post such as shown at 20 and posts 21, 22, 23, and 24. The spacing between perimeter posts might be from 12 to 17 feet. Interior posts can be alternated with tree planting locations as shown. One interior post is shown at 30.

Appropriate tension is maintained in both the north-south wires and the east-west lace wires in accordance with conventional known technology. The tension in the grid is provided by way of tie back assemblies as designated at 32, 33, 34, 35, 36, and 37. These tie backs are secured to posts as designated at 40, 41, 42, 43, 44, and 45. One manner of arranging the tie backs is that shown in FIG. 1, in which tie back wires are wrapped around the posts at the corners and intermediate positions of the grid and then fastened to the posts as shown at 40-45. Tension devices such as wire strainers and tension indicator springs may be used in the assembly as well known in the art.

FIG. 1 illustrates the holder of the invention installed at the intersection of the north-south and east-west wires of the grid.

A preferred form of the invention is illustrated in FIGS. 3 and 4 as designated by the numeral 50. In the exemplary form of the invention the holder is in the form of a cube of a material which may be plastic and which has at least a limited degree of resiliency. The cube has a top surface 52 which has in it a slot 54 preferably at the mid-point of that surface. The slot is shown more in detail in FIG. 4, the slot having a slight taper as shown. A wire 56 is positioned in the slot, the slot having a taper narrowing from the bottom towards the opening to the slot. The size of the slot is such that it can receive the wire 56 through the entrance to the slot by reason of the resiliency of the material, the wire 56 then being positioned at the bottom of the slot as shown.

The cube 50 has a bottom surface as designated by the numeral 62 in FIG. 4. This surface has a similar slot in it as designated at 64 which is like the slot 54 having the same type of taper. This slot receives a wire as designated at 66. The slot 64 in the preferred exemplary embodiment is oriented at an angle of 90° to slot 54 as shown. The depth of the slots is such that they do not intersect each other, but provide for there being material of the block in between the wires.

FIGS. 1 and 2 illustrate a trellis having holding devices as shown in FIGS. 3 and 4 positioned at the points where the wires intersect, that is, pass each other. The device securely holds the wires, but maintains them separated so that they do not rub against each other in such a way as to disturb the coating on the wires. As can be observed the device is extremely easy to install manually and without any tools. Further the device can be very easily manufactured or fabricated ecomonically due to its simplicity of construction and material used.

From the foregoing those skilled in the art will readily understand the nature of the invention and its implementation and the manner in which it achieves all the objects as set forth in the foregoing.

The foregoing disclosure is representative of a preferred form of the invention and is intended to be interpreted in an illustrative rather then a limiting sense, the invention to be accorded the full scope of the claims appended herewith. It is intended that the claims shall cover a reasonable range of equivalents encompassing variations and alternatives in the exact nature of the construction. It should be understood that the device does not necessarily require that the shape be that of a cube, but other shapes can be utilized. The device may be used in applications where the linear elongated elements such as wires do not pass each other at a 90° angle, but might pass at some other angle or orientation. While in the embodiment disclosed the wires are held in tapered slots variations may be made in the exact manner of reatining the wires.

What is claimed:

1. As an article of manufacture, a device for holding grid wires as and for a supporting trellis for kiwi plants and the like, said trellis including said wires which cross each other at an angle comprising in combination, an article which is an integral piece of holding material having at least a first side and a second side, said first side having a slot in it constructed to have a first wire positioned and held in the slot; said second side having a slot in it which slot is at an angle to the first slot corresponding to the angle between wires to be held, said second slot being adapted to receive and hold a second wire said wires being constructed and arranged to form a plant supporting grid, and means for supporting said wire grid and said articles in a generally horizontal plane spaced above a supporting surface.

2. An article as in claim 1 wherein said first side and second sides lie in parallel planes, each of said slots being normal to the respective side that it is in.

3. An article as in claim 1 wherein each slot has a taper between its bottom and the entrance to the slot, the bottom of each slot being of a size to receive its respective wire, the material of the article being such as to allow a wire to move through the entrance of a slot to the bottom thereof.

4. An article as in claim 1 wherein the article has third and fourth sides in each of which are ends of a slot, and fifth and sixth sides having in it ends of a slot.

5. An article as in claim 4 wherein the article is in the form of a cube, the slots being in opposite sides of the cube at an angle corresponding to the angle between the cross wires.

6. An article as in claim 3 wherein the taper of each slot is such that the entrance to each slot is narrower than the operative bottom of the slot provide a retaining effect.

7. An article as in claim 1 wherein the first slot and the second slot are of such depth that when the cross wires are in position they are separated from each other by a part of the article.

* * * * *